3,372,088
METAL PHOSPHIDE PESTICIDES
Werner Freyberg, am Weissenberg 33, and Wolfgang
Friemel, am Weissenberg 9, both of Kirschhausen
uber Heppenheim, Bergstrasse, Germany
No Drawing. Continuation-in-part of application Ser. No.
237,327, Nov. 13, 1962. This application Nov. 8, 1965,
Ser. No. 506,846
Claims priority, application Germany, Nov. 25, 1961
F 34,416
10 Claims. (Cl. 167—14)

This application is a continuation-in-part of application Serial No. 237,327 filed Nov. 13, 1962 now abandoned.

This invention relates to pesticidal compositions useful for combatting animal pests such as rodents and insects and more particularly to pesticidal metal phosphide compositions, their preparation and application.

Metal phosphides, such as calcium phosphide, magnesium phosphide and aluminum phosphide, have theretofore been used as pesticides due to their ability to evolve more or less pure hydrogen phosphide in the presence of water or water vapor with which they react. However, the reaction of water with some metal phosphides proceeds so violently that, due to the positive heat of reaction, the hydrogen phosphide formed, even when this is present in its purest form, spontaneously ignites. The tendency to spontaneous ignition of the hydrogen phosphide naturally renders the handling of easily decomposable phosphides very dangerous and calls for great care and skill in their preparation, storage, shipment and use.

In the past, efforts have been made to prevent such spontaneous ignition by admixing a blowing agent, i.e., a thermally easily decomposable substance such as sodium bicarbonate, ammonium carbonate, ammonium carbamate, urea and the like which, by requiring energy for dissociation, should take up the reaction heat of the hydrogen phosphide formation. In addition the gases formed, i.e., carbon dioxide or ammonia, lead to a raising of the lower ignition limit of the hydrogen phosphide. The use of a blowing agent has serious disadvantages and thus does not satisfactorily solve the problems involved. The main drawback resides in the fact that in the event of accidental or premature contact with water in liquid form, the protective materials, which, without exception are water soluble, can on the one hand, be separated from the phosphide which is then left unprotected and, on the other hand, the thermal decomposition of the protective substances in the solution proceeds at too low a reaction velocity. Under unfavorable conditions, therefore, it can happen that the gas which has formed ignites. Attempts have also been made to encrust calcium phosphide with molten sulfur and thus protect it against moisture. However, as before, the moisture can still penetrate into the cracks and pores formed in the sulfur coating when it hardens and, as a result the protective crust very rapidly crumbles away.

It is further known to provide the phosphides with a water-insoluble coating of hard paraffin by applying the paraffin in molten form and allowing it to solidify or by concentrating it by evaporation from a solvent. In this way, any likelihood of the phosphides coming in contact with moisture is entirely excluded. As, however, the desired formation of hydrogen phosphide can take place only with moisture in some form or other, it is necessary for a gas-producing agent or propellant to be added, and this will give rise to a splitting of the dense paraffin coating and to the formation of cracks therein in order that the moisture which is necessary can act on the phosphide. This is a distinct disadvantage because, as soon as the moisture—more particularly water in liquid form—has penetrated, whether it be through the known phenomenon of capillary condensation from the vapor phase or by direct seeping into the cracks, the paraffin skin breaks away to a very great extent in a short time. Another disadvantage is that the action of the blowing agent and the evolution of the hydrogen phosphide is entirely uncontrollable and depends on chance conditions.

In addition it is known to add volatile organic substances which, by reason of their high heat of vaporization, severely reduce the temperature of the phosphide and thus, to a certain extent, lead to a deceleration in the formation of hydrogen phosphide. However, mixtures of such substances frequently are difficult to handle in fumigation operations. Furthermore, a complete solution of the very complex problem of desensitizing, on the one hand, and control of the gas evolution, on the other, is not fully or adequately achieved.

The present invention is based on entirely different physico-chemical conditions and considerations from those hitherto applied.

Usually an adsorption at the points of maximum surface energy, such as corners, peaks and edges, precedes the wetting of a substance with water and the intake of moisture associated therewith. The more fissured such a surface is, the larger will be the contact with the liquid phase, and, accordingly, the greater and more rapid will be the moisture intake. As it is, most phosphides form a very hard and polycrystalline material of large surface area. If the active hydrophilic centers can be successfully blocked with hydrophobic substances, then wetting can be prevented. With such a blocking of the active hydrophilic centers, it is not necessary for the total surface to be provided with a coating but instead it is sufficient for only the said active hydrophilic centers themselves to be blocked (partial coating).

It has now been found that by partially coating metal phosphides such as calcium phosphide, magnesium phosphide, aluminum phosphide, etc., with a hydrophobic substance such as water-insoluble metal soaps, the partial coating of the metal phosphides, by which is meant the coating of the hydrophilic centers of the metal phosphides, retards the spontaneous ignition of the hydrogen phosphide evolved when said metal phosphides come in contact with moisture. This action has great advantages in that the handling and preparing of metal phosphide compositions becomes much less dangerous. The compositions of metal phosphides admixed with water insoluble metal soap have found great utility as pesticides of greatly increased shelf life.

Accordingly, there is provided by the present invention pesticidal compositions for combatting animal and insect pests comprising a metal phosphide in admixture with pulverulent water-insoluble metal soaps.

It has been found that the water-insoluble and, advantageously, also non-toxic metal soaps are best suited for the blocking effect of the hydrophilic centers. More particularly for this purpose there can be used salts of the alkaline earth metals, and light metal salts of aliphatic monocarboxylic acids having twelve to twenty-two carbon atoms, such as, for example, the corresponding stearates, oleates, palmitates, ricinoleates, behenates, myristates, arachinates, laurates and the like. Zinc, cadmium, calcium, magnesium and aluminum stearates have proved particularly suitable. These compounds can be produced as fine powders and can easily be admixed with phosphide. In this connection it was found that the efficacy of the metal soaps markedly increases with an increase in the length of time of mixing, and it is only with a particular minimum mixing time that they give rise to a constant hydrophobic effect. Usually mixing times of from ten to twenty minutes are adequate.

The desired effect is brought about by the fact that the hydrophilic portion of a chainlike molecule of the salts of higher fatty acids is physically adsorbed or even chemically absorbed at the active hydrophilic centers of the corresponding phosphide. As a result, the hydrophobic part of the chain molecule will reach the outside and increase the surface tension of the phosphide in such a way that wetting with liquid water is not possible.

Now the water-repelling action of metal soaps is known per se and, for example in the building trade, use is made of calcium stearate for rendering the outside plaster of houses water repellent. The particular applicability of these compounds for the purpose specified by the present invention could not, however, be deduced therefrom.

Results of two tests in particular carried out with mixtures according to the invention were altogether surprising. Thus, it could not be anticipated that both the diffusion of the water vapour—which is a prerequisite for gas evolution— and the rediffusion of the hydrogen phosphide would be present in the correct order of magnitude. Actually, gassing tests showed that the speed of the gas evolution of the mixtures used in accordance with the invention in the material to be treated or in air corresponds practically to that of the pure phosphide; thus, it is practically unimpeded. Only larger additions of metal soaps to the appropriate phosphides reduce the gassing velocity somewhat.

Equally surprising is the strong desensitizing action of the said metal soaps on the spontaneous ignition of the hydrogen phosphide. Thus, by the addition of a few percent of these substances, it is altogether unnecessary to make use of other, for example thermally easily decomposable, substances as the desensitizing agent. As a result it has been possible for the first time to package without risk insecticides having a content of more than 90 percent phosphide, as for example aluminum phosphide, to store them and to apply them to the goods to be treated therewith.

The desensitizing action of the metal soaps added in accordance with the invention is in some cases so great that even with the addition of hot water no ignition occurs of the hydrogen phosphide formed. Moreover, even the completely gassed out residues are still water repellent. The amount of metal soaps added can vary to a great extent depending upon the metal phosphide and will frequently lie between 0.3 and 70 percent by weight and preferably between 0.5 and 50 percent by weight (calculated on the total mixture). However, usually additions of between 5 and 30 percent by weight and especially between 10 and 20 percent by weight (based on the total mixture) serve the purpose adequately.

Some metal phosphides gas in an undesirably rapid manner when used, particularly at higher temperatures and moisture content. A retarding of the gassing velocity is therefore often desirable. It has now been further found that solid, strongly hygroscopic compounds which do not react with the phosphide are exceptionally well suited to reducing the gassing velocity of phosphides. Unfortunately such substances, as for example anhydrous aluminum chloride or calcium chloride or calcium oxide, dried magnesium chloride, or phosphorous pentoxide, have the undesirable property of heating strongly in the presence of moisture, more particularly with water is liquid form. This self-heating can, as is known with burnt lime, lead to burning. Therefore, it was most surprising to confirm that mixtures of metal phosphides and metal soaps when these hygroscopic compounds are added in no way have their good desensitizing properties impaired on contact with water.

Thus, in a further embodiment of the invention pesticidal compositions are provided which, in addition to having pulverulent water-insoluble metal soaps admixed with the metal phosphides contain an added hygroscopic substance. The addition of the hygroscopic substance greatly retards the gassing velocity of the phosphides. The further retardation of the chemical reaction between water and metal phosphide depends upon the percentage addition of the hygroscopic substance.

A dangerous heating could in no case be detected. Here, too, the active hydrophilic centers of the hygroscopic substances are effectively blocked by the metal soaps. For this reason the water can be absorptively bonded only relatively slowly through the vapor phase. In this way it is now possible within a pulverulent mixture of metal phosphides, metal soaps and strongly hygroscopic substances, or within the compressed particles prepared therefrom, to adjust any desired vapor partial pressures by means of percentage variation of the proportion of hygroscopic substances. In this manner, it is possible to allow the gassing of a metal phosphide to proceed at the speed required in that specific case, as, apart from temperature influence, the gassing velocity is only dependent upon the vapor partial pressure prevailing in the phosphide particles. Here the addition of hygroscopic substances still offers another appreciable advantage. The quantities of water first taken up by these substances can, in a stage of the final gassing, be transferred in part to the phosphide residues which have not yet been gassed out. Actually a sort of storing or repository action occurs with compounds such as, for example, dried magnesium chloride, due to the fact that, over and above the requirement of crystal water, water vapor can be taken up until the substance dissolves, the result being that towards the end of the water take-up, there is a lasting increase in the vapor tension in the vicinity of these particles. In an atmosphere of higher vapor content, the phosphide residues which are already surrounded by the decomposition products gasify out more rapidly.

The action is quite different in the case of calcium oxide. Here, the process is of a purely chemical nature. First, with formation of calcium hydroxide, vapor is taken up. This later converts to form calcium carbonate, with splitting off of water vapor, through the carbon dioxide which is already present in the material being treated or in the air. Taken as a whole, the added hygroscopic substances in conjunction with metal soaps act therefore as accumulators for the water vapor. In the first stage of the gassing, water vapor is withdrawn from the system and in this way the gassing of the metal phosphide is retarded. Later, water vapor is split off and, as a result, the gassing is brought to a conclusion at an accelerated rate, while without the addition of hygroscopic substances, the reaction is brought more and more slowly to its conclusion.

In accordance with the present invention also there is provided a process for preparing the pesticidal compositions which comprises admixing the metal phosphides with pulverulent water-insoluble metal soaps, said metal soaps partially coating the metal phosphides and thus reducing the ignition of hydrogen phosphide formed therefrom. Also envisaged by the present process is the embodiment wherein hygroscopic substances are admixed with the composition to reduce the gassing velocity of the reaction.

Due to the additions of metal soaps and hygroscopic substances in accordance with the invention, the decomposition of the metal phosphides with water and water vapor can thus be controlled in such a way that even with those metal phosphides which normally have a vigorous reaction, no ignition of the formed hydrogen phosphides occurs. The gassing velocity can, moreover, be fully adapted to the requirements of use and follows a continuous course. The addition of hygroscopic substance will in most cases amount to from 1 to 50 percent by weight (calculated on the total mixture), depending upon the desired gassing velocity. Preferably 5 to 40 percent by weight is used; in most cases no more than 20 percent is required.

The mixtures of metal phosphides and metal soaps according to the invention either with or without the addition of hygroscopic substances can in actual practice be used as powder or granules or in the form of larger compressed particles, such as tablets, for example.

The pesticidal compositions of the present invention are preferably used in tablet form for combatting animal pests, more especially rodents and insects in the disinfestation of warehouses and silos.

The invention is illustrated by the following non-limitative examples wherein the percentages are by weight.

Example 1

85 percent of aluminum phosphide and 15 percent of aluminum stearate are thoroughly mixed. A partial coating is obtained, with which the hydrophilic centers of the aluminum phosphide particles are coated and thereby blocked. On contact with water, there occurs no ignition of the hydrogen phosphide formed.

Example 2

70 percent of magnesium phosphide and 30 percent of zinc stearate are thoroughly mixed. The gassing proceeds almost as quickly as that of the pure phosphide. The desensitizing action of the stearate, however, prevents an ignition of the formed hydrogen phosphide on coming into contact with moisture. The same results are obtained by replacing the 30 percent of zinc stearate by the same amount of cadmium stearate.

Example 3

80 percent of aluminum phosphide is mixed with 10 percent magnesium stearate for fifteen minutes and then admixed with 10 percent of well-dried magnesium chloride. Even on coming into contact with hot water no ignition occurs. The gassing proceeds more slowly although with practically constant speed. If the 10 percent magnesium stearate is replaced by 10 percent by weight magnesium laurate essentially the same results are obtained.

Example 4

70 percent of aluminum phosphide is mixed with 15 percent of aluminum stearate and 15 percent calcium oxide in such a way that the aluminum phosphide is first thoroughly premixed with half of the aluminum stearate and calcium oxide with the other half. Both partial mixtures are then thoroughly mixed together and compressed into tablet form. When such tablets are placed in water, they decompose quite slowly without perceptible heat evolution. Even after some hours, the original form of the tablets is still recognizable. The calcium oxide may be replaced by the same amount of anhydrous calcium chloride with essentially the same results obtained.

Example 5

65 percent of magnesium phosphide is thoroughly premixed with 15 percent of aluminum stearate and then admixed with 20 percent of dry magnesium chloride. Contact with moisture does not lead to ignition of the formed hydrogen phosphide. The gassing of the mixture is distinctly slowed down. If desired, the magnesium chloride can be replaced by the same amount of aluminum chloride.

Example 6

90 percent calcium phosphide and 10 percent aluminum arachinate are thoroughly mixed. A partial coating is obtained with which the hydrophilic centers of the aluminum phosphide particles are coated and thereby blocked. On contact with water there occurs no ignition of the hydrogen phosphide formed. The 10 percent of aluminum arachinate was replaced by 10 percent calcium behenate with the same results.

Example 7

85 percent calcium phosphide is mixed with 10 percent aluminum stearate for 15 minutes and then admixed with 5 percent phosphorus pentoxide. On contact with water there occurs no ignition of the hydrogen phosphide. The gassing proceeds with practically constant speed.

Example 8

75 percent aluminum phosphide is mixed with 5 percent aluminum stearate for about 15 minutes and then admixed with 20 percent calcium oxide. On contact with water there occurs no ignition of the hydrogen phosphide. The gassing proceeds more slowly and with practically constant speed.

The coatings obtained in Examples 3 through 7 and 8 are of similar structure to those of Examples 1 and 2, i.e., the metal soap forms only a partial coating, by means of which the hydrophilic centers of the phosphide particles are blocked.

Other and further uses and modifications of the present invention will be appreciated by those skilled in the art by reference to this specification and the appended claims.

What is claimed is:

1. A pesticidal composition for combatting pests which comprises at least 50 percent by weight based on the total mixture of aluminum phosphide, calcium phosphide or magnesium phosphide in admixture with 0.5 to 50 percent by weight based on the total mixture, of an aluminum, cadmium, calcium, magnesium or zinc salt of an aliphatic monocarboxylic acid having between 12 and 22 carbon atoms in the fatty acid radical and 5 to 50 percent by weight based on the total mixture of a solid strongly hygroscopic compound which does not react with the phosphide, to protect the hydrophilic centers of the phosphide against moisture.

2. A pesticidal composition according to claim 1 wherein the composition is in powder form.

3. A pesticidal composition according to claim 1 wherein the composition is in the form of granules.

4. A pesticidal composition according to claim 1 wherein the composition is in the form of compressed tablets.

5. A pesticidal composition according to claim 1 wherein the salt is aluminum arachinate, aluminum stearate, cadmium stearate, calcium behenate, magnesium laurate, calcium stearate, magnesium stearate or zinc stearate.

6. A pesticidal composition according to claim 1 wherein the salt constitutes 10 to 20 percent by weight of the total mixture.

7. A pesticidal composition for combatting pests which comprises at least 50 percent by weight based on the total mixture of aluminum phosphide, calcium phosphide or magnesium phosphide in admixture with 0.5 to 50 percent by weight based on the total mixture, of an aluminum, cadmium, calcium, magnesium or zinc salt of an aliphatic monocarboxylic acid having between 12 and 22 carbon atoms in the fatty acid radical and 5 to 50 percent by weight based on the total mixture of anhydrous aluminum chloride, anhydrous calcium chloride, calcium oxide, dried magnesium chloride or phosphorus pentoxide to protect the hydrophilic centers of the phosphide against moisture.

8. A pesticidal composition according to claim 7 wherein the hygroscopic substance is present in an amount of 5 to 40 percent by weight calculated on the total mixture.

9. A pesticidal composition for combatting pests which comprises at least 50 percent by weight based on the total mixture of aluminum phosphide, calcium phosphide or magnesium phosphide in admixture with 10 to 20 percent by weight based on the total mixture of aluminum arachinate, aluminate stearate, cadmium stearate, calcium behenate, calcium stearate, magnesium laurate, magnesium stearate or zinc stearate and 5 to 40 percent by weight based on the total mixture of anhydrous aluminum chloride, anhydrous calcium chloride, calcium oxide, dried magnesium chloride or phosphorus pentoxide to protect the hydrophilic centers of the phosphide against moisture.

10. A process for combatting animal and insect pests which comprises fumigating an infested area with a composition of claim 9.

References Cited

UNITED STATES PATENTS

| | | | |
|---|---|---|---|
| 2,631,977 | 3/1953 | Allen et al. | 252—7 |
| 2,826,486 | 3/1958 | Huter | 167—14 X |
| 2,928,769 | 3/1960 | Gaunt | 167—82 |
| 3,132,067 | 5/1964 | Rauscher et al. | 167—14 |

LEWIS GOTTS, *Primary Examiner.*

R. HUFF, *Assistant Examiner.*